United States Patent [19]

Kerwin et al.

[11] Patent Number: 5,776,238
[45] Date of Patent: Jul. 7, 1998

[54] PRODUCTION OF PIGMENTS

[75] Inventors: Paul Kerwin, Bridge of Weir; Robert Langley, Glasgow; Arthur Stark Walls, Kilmarnock, all of Scotland

[73] Assignee: Ciba Specialty Chemicals Corporation, Terrytown, N.Y.

[21] Appl. No.: 768,052

[22] Filed: Dec. 16, 1996

[30] Foreign Application Priority Data

Dec. 23, 1995 [GB] United Kingdom ............ 9526517

[51] Int. Cl.⁶ .................... C09B 67/04; C09B 67/14; C09B 67/16
[52] U.S. Cl. ............. 106/412; 106/401; 106/410; 106/413; 106/499; 106/505
[58] Field of Search ................ 106/401, 410, 106/412, 413, 499, 505

[56] References Cited

U.S. PATENT DOCUMENTS

| | | | |
|---|---|---|---|
| 3,510,331 | 5/1970 | Talvenheimo et al. | 106/484 |
| 3,617,323 | 11/1971 | Riegler | 106/410 |
| 4,167,420 | 9/1979 | Linden et al. | 106/499 |
| 5,472,490 | 12/1995 | Sawamura et al. | 106/410 |

FOREIGN PATENT DOCUMENTS

| | | |
|---|---|---|
| 358197205A | 5/1982 | Japan. |
| 359062671A | 6/1983 | Japan. |
| 710229 | 6/1954 | United Kingdom. |
| 844405 | 8/1960 | United Kingdom. |
| 2042576 | 9/1980 | United Kingdom. |

OTHER PUBLICATIONS

Chem. Ab. 69:37195, Saha, "Metal pigment powder of low electrical conductivity.", Jun. 1968.

Chem. Ab. 93:151780, Bugrov et al., "Effect of fatty acids on the efficiency of pigment dispersions in printing inks.", (No Month) 1980.

*Primary Examiner*—Michael Marcheschi
*Attorney, Agent, or Firm*—Kevin T. Mansfield

[57] ABSTRACT

The present invention provides a process for converting a crude pigment into pigmentary form which comprises kneading the crude pigment in the presence of a liquid carboxylic acid and optionally a salt.

12 Claims, No Drawings

PRODUCTION OF PIGMENTS

The present invention relates to a process for converting a crude pigment into a pigmentary form.

Numerous methods are known for reducing the particle size of a crude pigment to a desired pigmentary size. Such methods include salt grinding, ball milling and kneading.

GB 1438921 describes a kneading process using a continuous kneading apparatus having at least two separated means for adding a liquid. Suitable liquids for this process include phenol, aniline, but particularly polyhydric aliphatic alcohols such as glycols. The temperatures used are between 120° and 350° C., preferably between 160° and 280° C.

We have now surprisingly found that if certain carboxylic acids are used as the liquid in a continuous kneading apparatus, the process can be operated at lower temperatures, it is not necessary to have at least two inlets for the liquid. In addition the acid can be easily recovered and re-used. The acid may be recovered by chemical means or by other methods such as steam distillation. In some cases the resulting product has better colour strength and gloss.

Accordingly the present invention provides a process for converting a crude pigment into pigmentary form which comprises kneading the crude pigment in the presence of a liquid carboxylic acid and optionally a salt.

By "crude pigment" we mean pigments as obtained from the synthesis in a highly aggregated state with a particle size not suitable for use as a pigment, or pigment which has been milled to produce a product which is also aggregated and has a broader particle size distribution than that obtained from the synthesis but still unsuitable for use as a pigment.

The kneader may be a batch kneader or a continuous kneader which may be a twin screw or four screw kneader or a single screw kneader which can execute oscillating movements.

Preferably a twin screw extruder is used.

When the kneader is a continuous kneader it may have a length: diameter ratio of from 10:1 to 50:1, preferably from 20:1 to 40:1. It may have from 1 to 20 kneading zones, preferably 5 to 10 kneading zones.

The carboxylic acid should be liquid at the operating temperature. A liquid aliphatic carboxylic acid having 4 to 20 carbon atoms is preferred and more preferably, one having from 6 to 20 carbon atoms. Examples of suitable carboxylic acids include 2-ethyl hexanoic acid, oleic acid, caproic acid, valeric acid or enanthic acid.

The operating temperature may be from 20° C. up to the boiling point of the acid, preferably from 80° to 120° C.

The temperature may be controlled by a water jacket on the kneader. The water circulating through the water jacket may be cooled to low temperatures by passing it through a chiller.

The carboxylic acid may be added to the kneader at one or more points along its length, but preferably through one inlet at the begining of the screw, before the first kneading zone.

The kneader may be one which subjects the pigment and salt to a shear gradient of 300 to 20,000 sec$^{-1}$, preferably 500 to 5,000 sec$^{-1}$, for a period of 10 seconds to 15 minutes, preferably 20 seconds to 6 minutes, in a continuously operating kneading apparatus the amount of liquid being so chosen that the energy taken up by kneading it between 0.2 and 15 kWh/kg of pigment processed, preferably between 0.4 and 8 kWh/kg.

Examples of suitable inorganic and organic salts are sodium chloride, potassium chloride, sodium sulphate, zinc chloride, calcium carbonate, sodium formate, sodium acetate, potassium sodium tartrate, calcium acetate, sodium citrate, calcium chloride, or mixtures thereof. The actual salt used should be selected so that it will not react with the acid being used and form a precipitate.

The salt may have a particle size of from 1–100 cm, preferably from 10–50 μm, as measured using a Malvern "MASTERSIZER X" particle size analyser (with dry powder feed capable of measuring up to 2 mm).

The amount of salt, if used, may be from 0.1 to 20 parts by weight per part of pigment.

The process of the invention is applicable to a wide variety of pigments which are subjected to a milling procedure as part of the finishing process. Examples of such pigments include phthalocyanines such as copper, zinc or nickel phthalocyanines, partially halogenated phthalocyanines, quinacridones, dioxazines, diketopyrrolo pyrroles, and perylenes.

After use, the carboxylic acid may be recovered by adding water and an alkali to the kneaded mass to covert the acid to a salt which is soluble. The pigment may then be filtered off and the filtrate acidified to release the free acid which may then be recovered and re-used.

The pigments may be treated with pigment additives during or after the kneading. Suitable additives include natural or synthetic resins, dyestuffs and, especially in the case of phthalocyanine pigments, amine salts of phthalocyanine sulphonic acids.

The invention is illustrated by the following Examples.

EXAMPLE 1

A type MP 2030 twin screw extruder of APV Newcastle-U-Lyme, UK, is fed with 2.09 Kghr$^{-1}$ of a copper phthalocyanine crude (CuPc) and 8.78 Kghr$^{-1}$ of NaCl. 1.63 Kghr$^{-1}$ of 2-ethyl-hexanoic acid (2EHA) are fed into a single orifice at the begining of the screw. The ratio of 2EHA to salt/copper phthalocyanine mixture is 15%. The resultant torque observed is 49% (3.68KW). The specific energy generated is 1.76 Kg$^{-1}$ CuPc. The shear gradient is 1675 s$^{-1}$.

The screw is cooled over its entire length with water at 15° C. The kneaded mass exits the screw at 100°–110° C. while the temperature in the kneading zones is between 20°–110° C. 200 g of the kneaded mass are added to 440 g of water. To the kneaded mass and water are added 12.33 g of NaOH (40%) and 2.43 g of NH$_4$OH (33%) and the mixture is stirred for 1 hour at 70° C. The mixture is filtered and the mother liquor and first 100 mls wash are collected before the press-cake is washed salt-free with warm water. The press-cake is dried in a circulating oven at 70°–80° C.

To the mother liquor and first 100 mls wash are added 19.69 g of concentrated HCl (35.6%) in order to reprecipitate 2EHA which is separated from the aqueous layer using a gravity separating funnel. The recovered 2EHA can be re-used for the size reduction of more CuPc crude in an extruder.

The resultant pigment is in the β-modification and shows excellent strength, gloss, flow and dispersion when incorporated into an oil ink vehicle.

EXAMPLE 2

A CuPc pigment is produced according to the method of Example 1. 200 g of the kneaded mass are added to 440 g of water. To the kneaded mass and water are added 12.33 g of NaOH (47%) and 2.43 g of NH$_4$OH (33%) and the mixture stirred for 30 minutes at 70° C. At this point 2.75 g of the dodecyl amine salt of copper phthalocyanine mono sulphonic acid, which have previously been dispersed in 100 g of water for 15 minutes using a Silverson dispersion apparatus at 4000 rpm, are added to the kneaded mass dispersion and mixing continues for a further 1 hour at 70° C. The slurry is filtered and the mother liquor and first 100 g water wash are recovered and filtered before washing salt free.

The presscake is reslurried in 500 g of water and 10 g of Hcl (36%) at 70° C. for one hour before filtering and washing salt free. The presscake is then dried in an air circulating oven at 70° C. overnight. The 2-ethyl hexanoic acid used to knead the pigment is recovered according to the procedure described in Example 1. The pigment shows excellent strength, gloss and dispersibility in a liquid ink varnish.

EXAMPLE 3

A pigment is prepared in the manner of Example 1, except that supplied to the extruder are 0.03 Kghr$^{-1}$ of polymerised rosin (trade name SYLVATAC 95), 2.01 Kghr$^{-1}$ CuPc, 8.46 Kghr$^{-1}$ NaCl and 2.00 Kghr$^{-1}$ 2-ethyl hexanoic acid. The pigment and solvent are recovered according to the process described in Example 1. The resulting blue pigment shows excellent strength, gloss and dispersibility in oil inks.

EXAMPLE 4

A pigment is prepared in the manner of Example 1, except that after the washing stage the presscake is reslurried in 500 g of water using a paddle stirrer. The potassium salt of a polymerised rosin (trade name SYLVATAC 95) (2% by mass of the pigment) is added to the slurry with the subsequent addition of Hcl to precipitate the resin onto the pigment surface. After filtration and washing, the pigment is dried at 70° C. overnight in an air circulating oven. The resulting blue pigment shows excellent strength, gloss and dispersibility in oil inks.

EXAMPLE 5

A CuPc Pigment is prepared as in Example 1, except that the kneading solvent used is oleic acid. The oleic acid is recovered in a indentical manner to the 2-ethyl hexanoic acid in Example 1. The resultant pigment is in the β modification and shows excellent strength, gloss, flow and dispersion when incorporated into an oil ink vehicle.

EXAMPLE 6

A dioxazine violet crude is converted to a pigmentary form using NaCl and 2-ethyl hexanoic acid as in Example 1. The final pigment shows excellent strength and purity when incorporated into an oil ink vehicle.

EXAMPLE 7

Chlorinated Crude Copper Phthalocyanine is converted to a pigmentary form using NaCl and 2-ethyl hexanoic acid as in Example 1. The final pigment shows excellent strength, gloss and purity when incorporated into an oil ink vehicle.

EXAMPLE 8

A CuPc pigment is prepared as in Example 1, except that the kneading salt is KCl. The resultant pigment is in the 0 modification and shows excellent strength, gloss, flow and dispersion when incorporated into an oil ink vehicle.

EXAMPLE 9

8 kg of crude CuPc and 1 kg of NaCl are ground in a ball mill for 5 hours. This mixture is then adjusted such that the CuPc to NaCl ratio is 1:4.2. This mixture is then supplied to a twin screw extruder as in Example 1. Using an identical recovery procedure, the finished pigment shows excellent strength, gloss and flow when incorporated into an oil ink vehicle.

EXAMPLE 10

250 g Crude Copper Phthalocyanine is placed in a batch kneading apparatus (WINKWORTH 2Z "Z" blade-mixer, equipped with water cooling and 0.37 kw motor) together with 224 g of 2-ethyl hexanoic acid and mixed well. After the sequential addition of 1215 g of NaCl the mixture is kneaded for 6 hours at 100° C. (±10° C.) generating a specific energy of 2.2 KwHr kg$^{-1}$.

The kneaded mass is collected in 3716 g of water. To the kneaded mass and water are added 119 g of NaOH (47%) and 10 g of NH$_4$OH (33%) and the mixture is stirred for 1 hour at 70° C. The mixture is filtered and the mother liquor and 1st 800 mls wash are collected before the press cake is washed salt free with warm water. The presscake is dried in an air circulating oven at 70°–80° C. To the mother liquor and 1st 800 mls wash are added 165 g of HCl (35.6%) in order to reprecipitate the 2EHA which is separated from the aqueous layer using a gravity separating funnel.

The resultant pigment is in the Beta modification and shows excellent strength, gloss and flow dispersion when incorporated into an oil ink vehicle.

EXAMPLE 11

8 kg of crude CuPc is ground in a ball mill for 5 hours. This material is then supplied to a twin screw extruder at 2.0 kghr$^{-1}$. Simultaneously, 3.0 kghr$^{-1}$ of 2-ethyl hexanoic acid are fed into a single orifice at the beginning of the screw. The resultant torque observed is 63% (4.73KW).

The resultant pigmentary material is isolated from the carboxylic acid and shows excellent strength, gloss, flow and dispersibility when incorporated into an oil ink vehicle.

We claim:

1. A process for converting a crude non-pigmentary form of an organic pigment into pigmentary form which comprises
   a) kneading the crude non-pigmentary form of an organic pigment in the presence of a liquid carboxylic acid having 6 to 20 carbon atoms and optionally an inorganic or organic salt, and
   b) separating the pigment produced from step (a) from the liquid carboxylic acid and optional inorganic or organic salt.

2. A process as claimed in claim 1 in which the carboxylic acid is 2-ethyl hexanoic acid, oleic acid, caproic acid, valeric acid or enanthic acid.

3. A process as claimed in claim 1 which is carried out at a temperature from 20° C. up to the a temperature at which the acid boils.

4. A process as claimed in claim 1 which is carried out at a temperature from 80° C. to 120° C.

5. A process as claimed in claim 1 in which the kneader is a batch kneader or a continuous kneader.

6. A process as claimed in claim 5 in which a twin screw extruder is used.

7. A process as claimed in claim 1 in which the acid is introduced into a screw kneader through one inlet at the beginning of the screw kneader.

8. A process as claimed in claim 1 in which the acid is recovered after use and is recycled.

9. A process as claimed in claim 1 in which a salt is present and the amount of salt is 0.1 to 20 parts by weight per part of pigment.

10. A process as claimed in claim 1 in which the pigment is a phthalocyanine, a partially halogenated phthalocyanine, a quinacridone, a dioxazine, a diketopyrrolo pyrrole or a perylene.

11. A process as claimed in claim 1 in which the pigment is treated with a conventional pigment additive during or after the kneading.

12. A process as claimed in claim 11 in which the pigment is phthalocyanine and the pigment additive is an amine salt of a phthalocyanine sulphonic acid.

* * * * *